(No Model.) 9 Sheets—Sheet 1.

T. McBRIDE & E. FISHER.
MACHINE FOR ROLLING SHAFTS, &c.

No. 400,099. Patented Mar. 26, 1889.

Fig. 1.

WITNESSES,
Edwin I. Yewell,
Chas Helm.

INVENTORS
Thos. McBride
E. Fisher
By
L. H. Ginnabaugh
Attorney.

(No Model.) 9 Sheets—Sheet 2.

T. McBRIDE & E. FISHER.
MACHINE FOR ROLLING SHAFTS, &c.

No. 400,099. Patented Mar. 26, 1889.

WITNESSES
Edwin D. Yewell
Alex Mahon

INVENTORS.
Thos. McBride
E. Fisher
By
S. W. Ensabaugh
Attorney.

(No Model.) 9 Sheets—Sheet 3.

T. McBRIDE & E. FISHER.
MACHINE FOR ROLLING SHAFTS, &c.

No. 400,099. Patented Mar. 26, 1889.

WITNESSES,
Edwin L. Yewell.
Alex Mahon.

INVENTORS
Thos McBride
E. Fisher
By
S. H. Ginsabaugh
Attorney (No Model.) 9 Sheets—Sheet 4.

T. McBRIDE & E. FISHER.
MACHINE FOR ROLLING SHAFTS, &c.

No. 400,099. Patented Mar. 26, 1889.

WITNESSES
Edwin T. Yewell.
Chas Helm.

INVENTORS.
Thos McBride
E. Fisher
BY
Attorney.

(No Model.) 9 Sheets—Sheet 5.

T. McBRIDE & E. FISHER.
MACHINE FOR ROLLING SHAFTS, &c.

No. 400,099. Patented Mar. 26, 1889.

WITNESSES
Edwin L. Yewell.
Alex Mahon.

INVENTORS
Thos. McBride
E. Fisher
By
Ginsabaugh
Attorney

(No Model.) 9 Sheets—Sheet 7.

T. McBRIDE & E. FISHER.
MACHINE FOR ROLLING SHAFTS, &c.

No. 400,099. Patented Mar. 26, 1889.

WITNESSES,
Edwin I. Yewell,
Alex Mahon.

INVENTORS,
Thos. McBride
E. Fisher
By
S. W. Ginsabaugh
Attorney.

(No Model.) 9 Sheets—Sheet 8.

T. McBRIDE & E. FISHER.
MACHINE FOR ROLLING SHAFTS, &c.

No. 400,099. Patented Mar. 26, 1889.

WITNESSES,
Edwin L. Yewell
Alex Mahon

INVENTORS
Thos. McBride
E. Fisher
By S. W. Zimbaugh
Attorney.

UNITED STATES PATENT OFFICE.

THOMAS McBRIDE, OF PHILADELPHIA, PENNSYLVANIA, AND EBENEZER FISHER, OF KINCARDINE, ONTARIO, CANADA.

MACHINE FOR ROLLING SHAFTS, &c.

SPECIFICATION forming part of Letters Patent No. 400,099, dated March 26, 1889.

Application filed May 23, 1888. Serial No. 274,850. (No model.)

*To all whom it may concern:*

Be it known that we, THOMAS MCBRIDE, a citizen of the United States, and a resident of Philadelphia, Pennsylvania, and EBENEZER FISHER, a subject of the Queen of Great Britain, residing at Kincardine, in the Province of Ontario and Dominion of Canada, have invented certain new and useful Improvements in Machines for Rolling Shafts, &c., of which the following is a specification, reference being had therein to the accompanying drawings.

Our invention relates to improvements in machines for rolling shafting, car, wagon, and carriage axles.

The main object of our invention is to produce shafting of a decimal size, which will be straight and perfectly round, in one and the same operation.

Our invention consists in mounting one of the rolls in sliding bearings, said bearings being adjusted toward or from the other roll by suitable devices, which will insure a perfect alignment and adjustment of said rolls.

Our invention consists, further, in driving the rolls by means of a worm-gearing, so as to insure a uniform movement of the rolls and allow them to impinge on the shaft being rolled with an equal pressure, so as to produce an article of uniform density and temper throughout its entire length.

Our invention consists, further, in the arrangement and construction of adjustable guides and supports, which will hold the shaft being rolled in its proper position with relation to the center of the rolls, and at the same time allow the shaft to be automatically fed forward into the rolls at proper intervals.

Our invention consists, further, in certain details of construction, which will be fully described hereinafter, and pointed out in the claims.

Referring to the drawings, Fig. 1ᵃ is a side view of the other portion of the machine. Fig. 2ᵃ is a top or plan view of the other portion of the machine. Fig. 3 is a sectional end view of the machine taken on the line $x\,x$ of Fig. 2 and looking in the direction of the arrow. Fig. 15 is a side view of the bifurcated yoke that operates the guides.

A indicates the frame of the machine, which is built in a substantial manner to stand the strain to which the operating parts are subjected, and in which the rolls B and C are mounted in suitable bearings or housings, such as is well known in this class of machines.

The roll B is mounted in stationary bearings, while the roll C is mounted in movable bearings D, provided with suitable adjusting devices and means for operating the same, as will more fully hereinafter appear. The outer ends of the rolls B and C are provided with worm-wheels E, which engage with worms F, formed on the main driving-shaft G, said shaft being mounted in suitable supports at one side of the machine and provided with a band-pulley, H, through which motion is imparted to the shaft from any suitable source of power.

I is a friction-clutch, which engages with the band-pulley H to change the same from a fast to a loose pulley, said clutch being operated by the arm K and lever L to throw the clutch in or out of engagement with the band-pulley H in a manner well known in this class of devices.

I will now describe the automatic guides for holding the material to be operated upon in its proper relation to the rolls and the devices for operating said guides.

M are metallic bars or plates secured to the frames or housings above and below the rolls by means of headed bolts $a$, which work in recessed grooves $b$, formed in said frames, so that the bars or plates M can be adjusted with relation to the fixed roll B. The bars or plates M are provided with extensions N and with slots $e$, in which the plates O for holding the guides are located. The plates O are movably secured in the extensions of the cross-bars M by means of bolts $d$, working in the slots $e$.

P are the guides, secured to the lower ends of the plates O by means of the bolts $f$, passing through the slots $g$, and by which means the guides are held in position with relation to the plates O, the screw-bolts $h$ serving to adjust the guides in their proper position before the bolts $f$ are tightened, and in this way the guides can be moved toward the rolling center as their edges are worn away. The guides P extend across the entire width of the rolls, so that the bar or shaft to be rolled will be firmly supported throughout its entire length during the process of rolling. The guides and plates to which they are attached are automatically operated to meet the requirements of shafts or rods of different diameters by means of the following devices:

R are yokes which encircle the axis of the roll C, one at each side of the machine, said yokes being provided with bifurcated extensions S, which are flanged, as shown at $i$, Fig. 3, to engage offsets $k$, formed on the plates O, so that as the roll C is moved back from the roll B, the plates O, with the guides, will be moved from each other in opposite directions and the space between the guides enlarged; but when the roll C is moved toward the roll B the guides will approach each other and the distance between the guides diminished. This provides means by which the guides can be set automatically to suit shafts or rods of different sizes by the movement or adjustment of the movable roll C.

T are wedge-shaped blocks supported from the plates O by means of the bent bolts V, the inclined portions of said blocks being designed to rest against the inclined portions of the yokes, which prevent the guides from being forced back from a line parallel with the axis of the rolls by the material which is being operated upon.

As before stated, the rolls B and C are mounted in suitable bearings or boxes in the frame of the machine, the faces of said rolls being provided with one or more flattened portions, $m$, and so timed in their movements with relation to each other that the flattened portions will be facing each other when they reach the point where the shaft or rod is introduced to be operated upon by the rolls, thus providing an open space into which the shaft or rod is moved forward the proper distance before the circular portions of the periphery of the rolls impinge upon the article being rolled.

The rolls B and C are provided with annular grooves $n$ to arrest the oil, water, and scale and prevent the same from working into the bearings or journals of the rolls, and thus obviate undue wear of the journals and journal-boxes.

The journal-boxes of each of the rolls are provided with screw-bolts $o$, having heads $p$, and a jam-nut, $r$, to hold said bolts in their proper position. The office or function of the bolts $o$ is to hold the rolls the proper distance apart, so that they will be perfectly solid and will at all times retain their proper positions. The heads of the bolts in one journal-box coming in contact with the heads of the bolts in the other journal-box prevents the rolls from moving toward each other, and in this way a true and perfect alignment of the rolls is at all times preserved no matter what amount of strain the rolls may be subjected to.

W and W' are screw-shafts working within suitable screw-nuts located in the rear ends of the journal-boxes of the roll C. The screw-shafts W and W' are mounted in suitable bearings, and are provided with gear-wheels A' A'', which are driven by the devices which will now be described.

Figure 1:
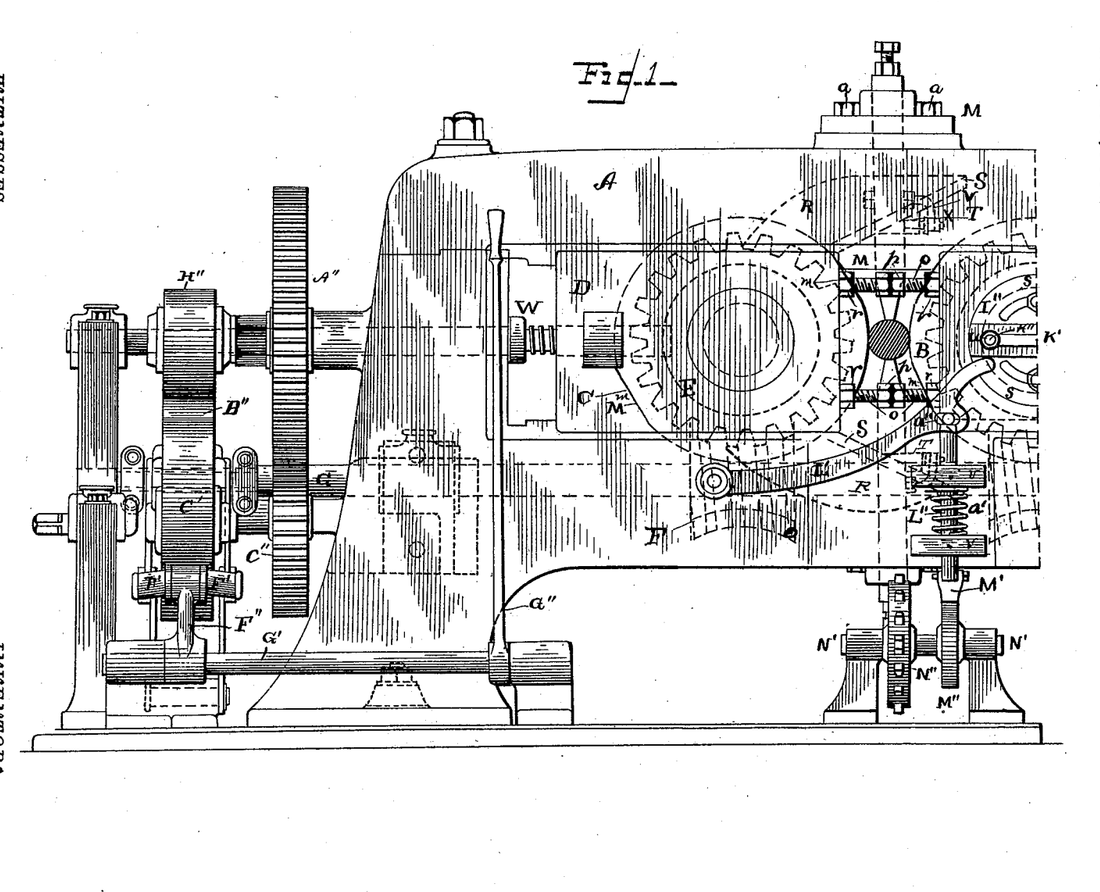
Figure 1 is a side elevation of a portion of the machine.
Figure 1A:
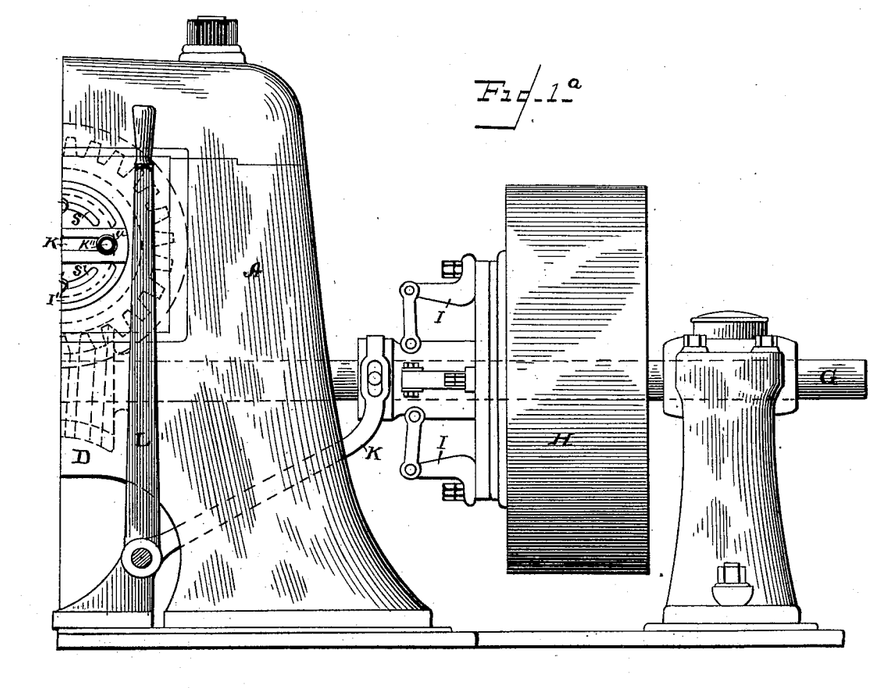
Figure 2:
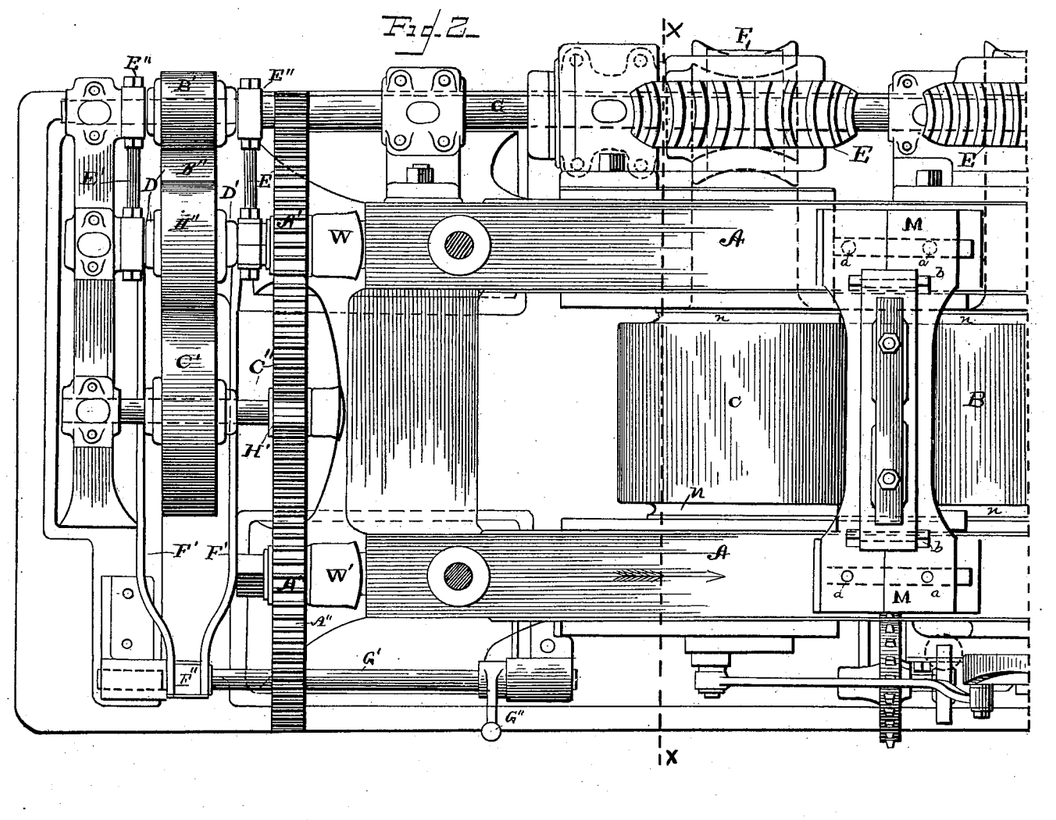
Fig. 2 is a top or plan view of a portion of the machine.
Figures 2A, 5:
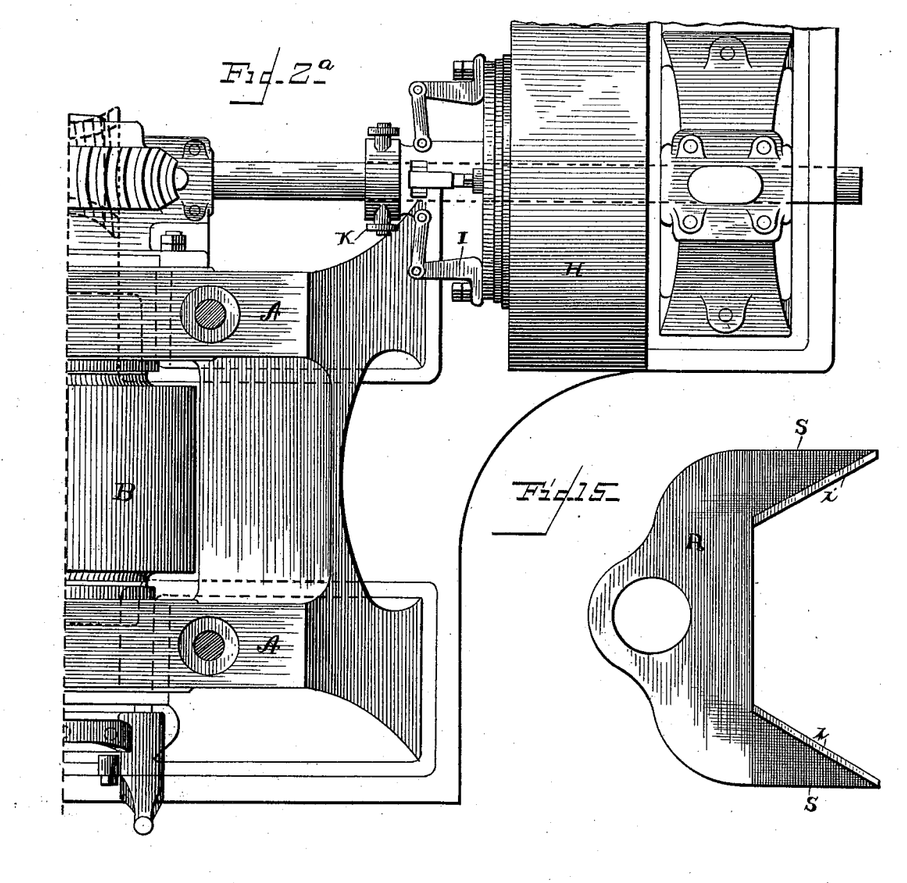
Fig. 5 is a front view of one set of guide-plates.
Figure 4:
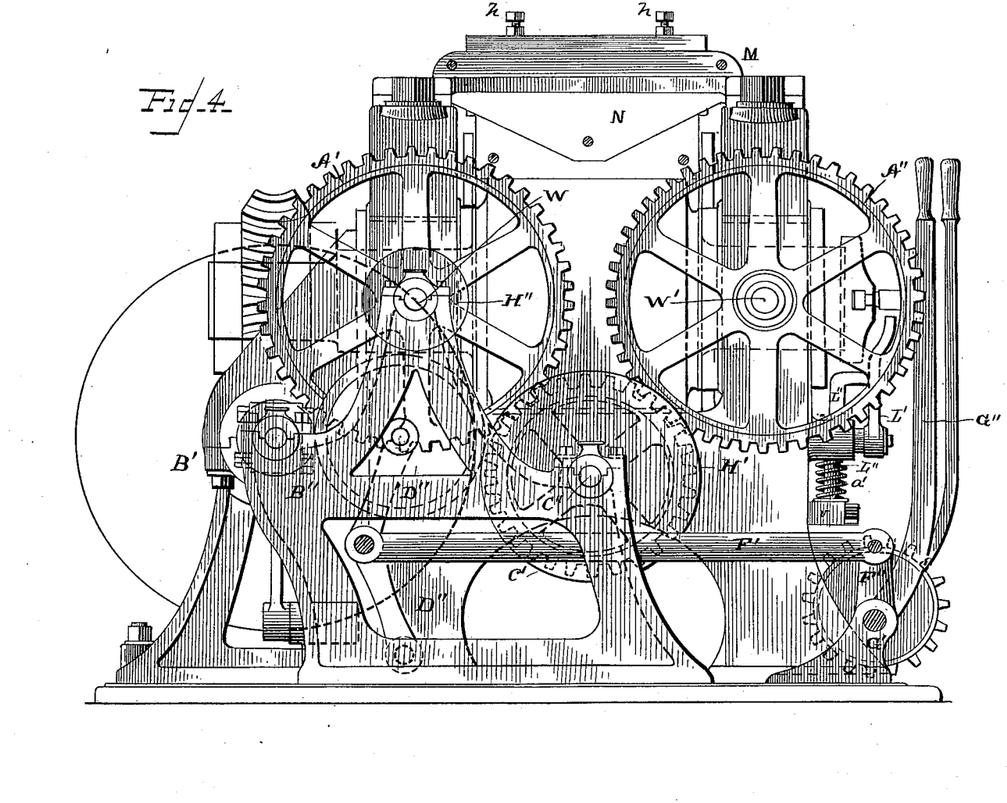
Fig. 4 is an end view of the machine.
Figure 5:
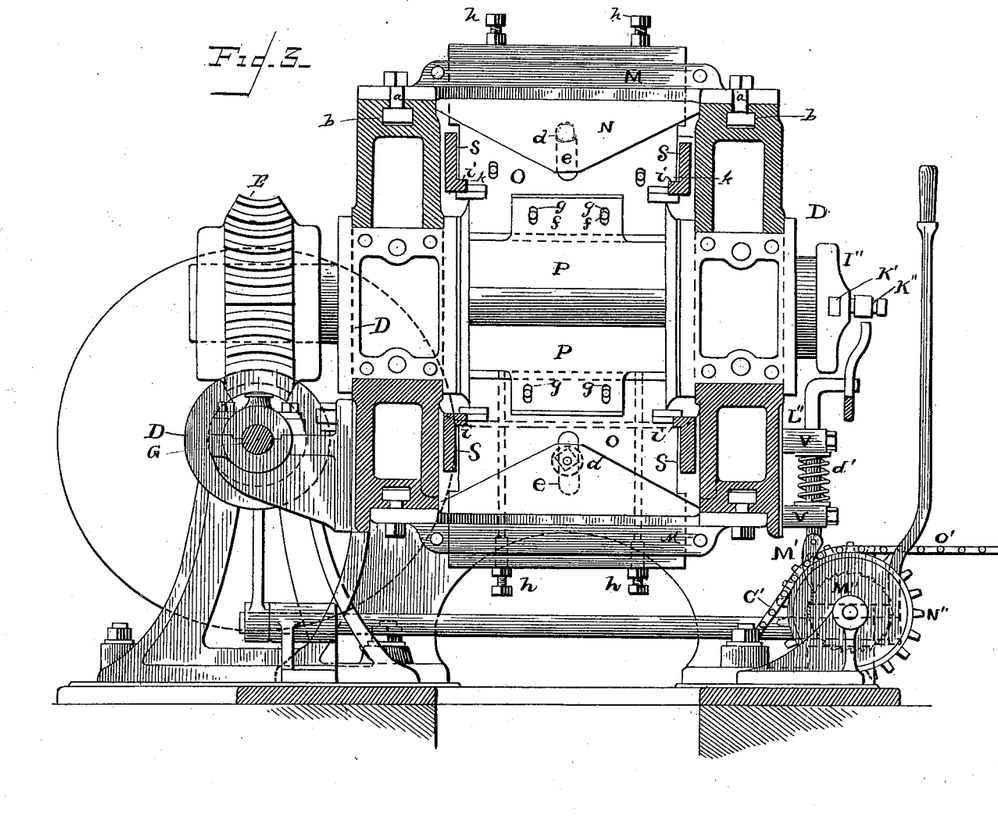
Figure 6:
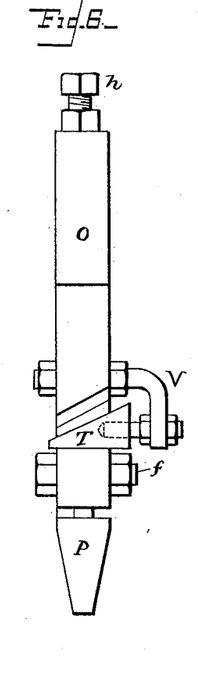
Fig. 6 is an end view of one of the guide-plates.
Figure 7:
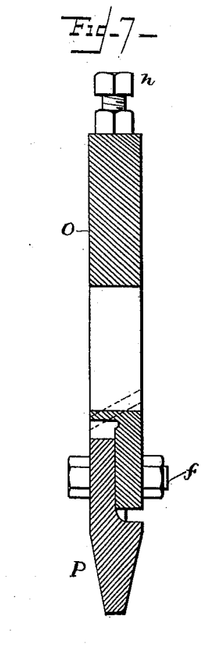
Fig. 7 is a sectional view of one of the guide-plates taken on the line $y\,y$ of Fig. 5.
Figure 8:
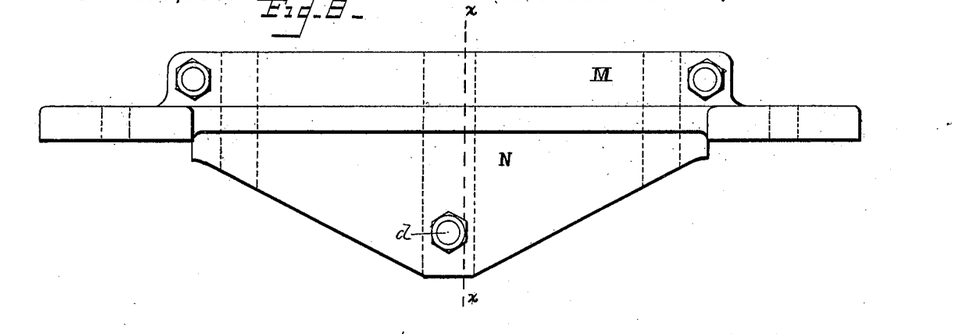
Fig. 8 is a side view of one of the plates which support the guide-plates.
Figure 9:
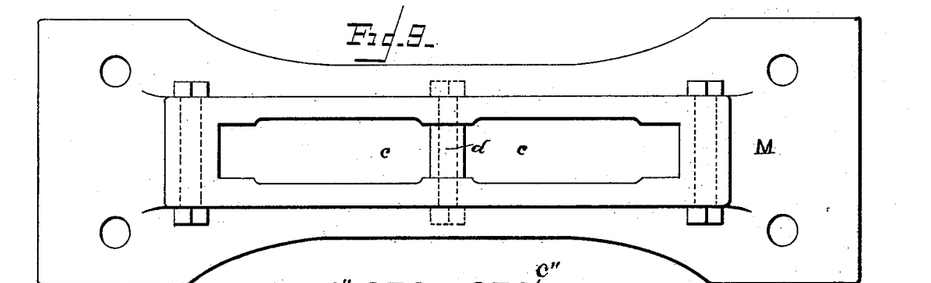
Fig. 9 is a top or plan view of the device shown in Fig. 8.
Figure 10:
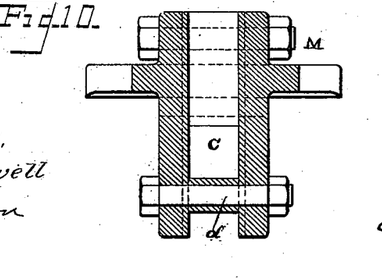
Fig. 10 is a sectional view of the device shown in Fig. 8, taken on the line $x'\,x'$ of said figure.
Figure 11:
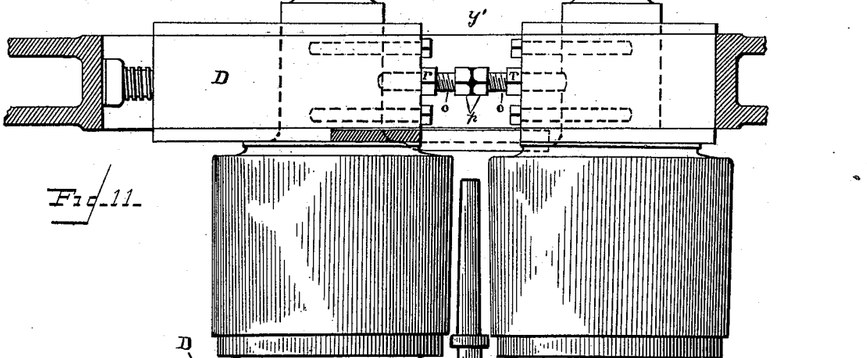
Fig. 11 is a plan view, partly in section, of the rolls for rolling carriage-axles.
Figure 12:
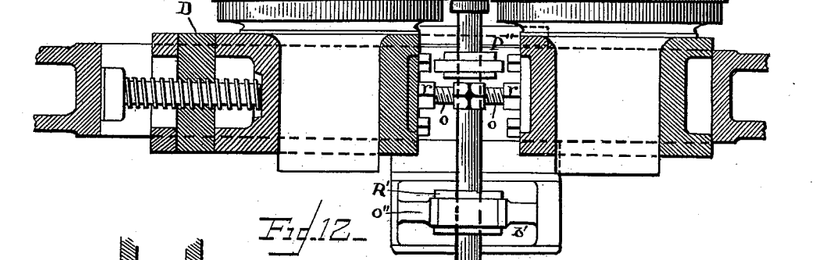
Fig. 12 is a vertical sectional view of Fig. 11, taken on the line $y'\,y'$.
Figure 13:
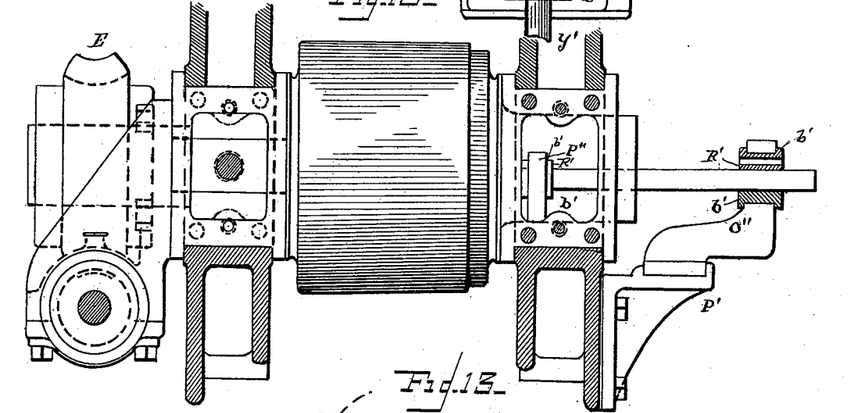
Fig. 13 is an end view of the rolls, showing the supports for the material to be rolled.
Figure 14:
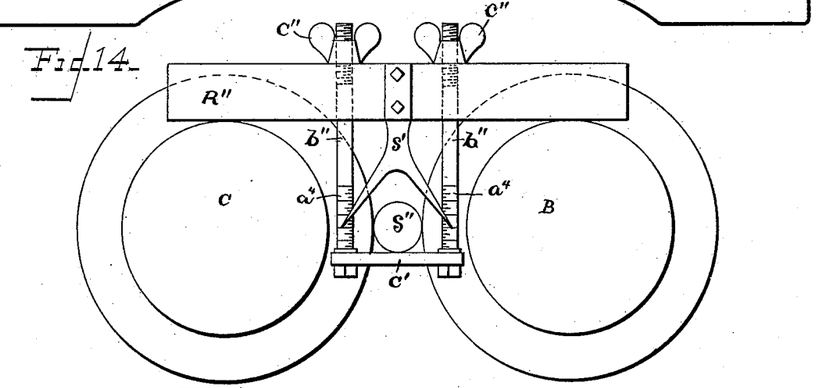
Fig. 14 is a side view of the device for adjusting the material to the central rolling-line.

B' is a friction-roll mounted on the main driving-shaft G, which imparts motion to the friction-wheel B'', said wheel being mounted in bearing D', which is supported by the toggle-levers D''. The bearing D' is held from lateral and longitudinal displacement by the bars E', which are secured to the boxes of the bearing and to the boxes E'', which surround the main driving-shaft. The lower ends of the toggle-levers D'' are secured to the bed of the machine, while their central portions are secured to inner ends of the rod E', the outer ends of said rods being secured to the arm F'' of the shaft G', the shaft G' being operated by the hand-lever G''. The friction-wheel B' imparts motion to the wheel B'', which, when in the position shown in Fig. 4, imparts motion to the wheel C', mounted on the shaft C''.

The inner end of the shaft C'' is provided with a pinion-wheel, H', which meshes with the gear-wheels A' and A'' on the shafts W and W'. The shaft W is also provided with a friction-wheel, H'', which receives motion from the friction-wheel B'' when the same is brought into contact with it.

The office or function of the devices just described is to move the roll C toward or from the stationary roll B, and the operation is as follows: When it is desired to impart motion to the screw-shafts W W' to move the roll forward, the friction-wheel B'' is brought into contact with the friction-wheel C' by the manipulation of the hand-lever G'', which imparts motion to the shaft C'' and to the wheels A' A'' on the shaft W and W' by means of the pinion-wheel H' on the end of the shaft C'', and when it is desired to move the roll C back the friction-wheel C' is brought into contact with the friction-wheel H'' on the shaft W by drawing the lever G'' out to straighten the toggles D''. This reverses the movement of the shafts W and W' and moves the roll C quickly rearward. It will be understood that when the shafts to be rolled are of a uniform size it will not be necessary to change the position of the roll C when it has been once properly set and adjusted; but when axles for wagons, &c., are to be rolled in both a hot and cold condition it may be necessary to have frequent adjustments of the rolls, and in this case rolls of the proper taper and form are substituted for the plain rolls. The material to be rolled, as has been intimated, is fed in at the side of the machine on a line parallel with the axis of the rolls and emerges through an opening in the other side of the machine, and, as has also been indicated, the rolls are made flat in certain portions in order that the shaft being rolled may be fed forward at proper intervals, and in order to do this automatically and at the proper moment of time I employ the following devices: I'' is a metal plate or disk secured to the outer end of the roll B by means of screw-bolts $s$ passing through the segmental slots into the end of the roll. The object of having the slots segmental is to allow the disk or plate I'' to be adjusted to any desired position on the end of the roll. The plate or disk I'' is provided with a dovetailed groove, K', to receive the correspondingly-shaped heads of the studs K'', said studs being screw-threaded at their outer ends to receive a screw-threaded nut, $u$, and by which said studs are held in position in the groove K' and rendered capable of being adjusted or fixed at any desired point in said groove K'.

L' is a lever pivoted at one end to the side of the machine, while the other or free end projects into the path of the stud K'' and by which said lever is operated, the throw of said lever being regulated by the distance the studs are located from the periphery of the disk I''.

L'' is a rod held in suitable guides, $v$, and supported by a spring, $a'$, said rod being bent at the top to a right angle to enter a slot, $a''$, formed in the lever L'. The object of the slot $a''$ is to allow the arm of the rod L'' to have certain amount of motion therein, so the rod will not impinge on the sides of the guides $v$. The lower end of the rod L'' is provided with a pawl, M', which engages with a ratchet-wheel, M'', mounted on the shaft N', said shaft being also provided with a sprocket-wheel, N'', which operates the sprocket-chain O', said sprocket-chain being connected to the shaft or rod, which is being rolled in any suitable manner, so as to feed the same forward into the rolls at each downward movement of the lever L', the motion of the lever being so timed by the position of the studs K'' that the shaft or bar will be advanced between the rolls when the flat portions of said rolls have reached the rolling center.

O'' is a support mounted on the bracket P', secured to the side of the machine, a similar support, P'', being placed between the housings of the rolls to more effectually support the article which is being rolled.

R' are thimbles mounted in the supports O'' and P'', said thimbles being made in two parts and held loosely in such supports by the flanges $b'$. When it is desired to roll axles or shafts from square or irregular-shaped metal bars, the openings in the thimbles are made to conform to the shape being rolled, so that the thimbles and bar will revolve together when acted upon by the rolls B and C.

For the purpose of setting the guides and adjusting the material to be rolled to the proper rolling center, I employ the following devices:

R'' is a bar of any suitable material, through which are passed the bolts $b''$, said bolts being connected at their lower ends by the cross-bar $c'$ to form a stirrup, the upper ends of said bolts being screw-threaded to receive the thumb-nuts $c''$, and by which the bolts $b''$ and cross-bars $c'$ are raised and lowered.

S' is a metal plate secured to the side of the bar R'' in a firm and substantial manner, the lower end of said plate being bifurcated. The ends of the bifurcated portions of the plate are drawn to a fine point and adapted to lie close to the sides of the bolts $b''$, on both of which is formed a linear scale, $a^4$. The points of the bifurcated plate indicate the rolling center, so that when the bar R''—one on each side of the machine—has been laid on the journals of the rolls B and C and the testing-shaft S'' laid on the cross-bars $c'$ the thumb-nuts are turned to raise or lower the bolts $b'$, so that the center of said shaft will be on a line with the center of the rolls. The guides P are now adjusted so as to impinge on the testing-shaft S''. After the guides have been secured in position the testing-shaft S'' is removed, the bars R'' taken from one of the journals of the rolls, and the shaft to be rolled inserted between the rolls C B.

Having thus described our invention, what we claim, and desire to secure by Letters Patent, is—

1. In a machine for rolling metal, the combination of two rolls geared to run at a uniform rate of speed, and each having a flat surface throughout its length, the rolls being so arranged that the flat surfaces will face each other during each revolution to allow the material to be fed forward, and one roll being adjustable toward and from the other, substantially as shown and described.

2. In a machine for rolling metal, the combination of two rolls geared to run at a uniform rate of speed, one roll being adjustable toward and from the other, and adjustable upper and lower guides or supports between said rolls to support and hold the material being rolled, substantially as shown and described.

3. In a machine for rolling metal, the combination of the roll B, mounted in permanent bearings, the roll C, mounted in adjustable bearings, adjustable upper and lower guides between said rolls to support and hold the material being rolled, and yokes R, to control the said guides, substantially as shown and described.

4. In a machine for rolling metal, having two rolls, one of which has stationary bearings and the other of which is movable toward and from the first, the combination, with the journals of the movable roll, of upper and lower guide-plates to guide and support the material being rolled, and yokes R, secured to the journals of the movable roll, and provided with inclined arms S, to engage and adjust the guide-plates, substantially as shown and described.

5. The guides P, adjustably secured to the plates O, in combination with the adjustable plates M, whereby the guides are adapted to be adjusted in a vertical and horizontal direction, as set forth.

6. The combination of the plates O, the yoke R, provided with arms S, and the wedges T, the said wedges being adapted to engage the edges of the arms S, whereby the guides are held against displacement, substantially as shown and described.

7. The combination, with the rolls B C and their journal boxes or housings, of the screw-bolts $o$, having heads $p$ and jam-nuts $m$, the bolts in opposite boxes projecting into contact with each other, whereby the rolls are prevented from approaching each other, substantially as shown and described.

8. The roll B, provided with disk I'' and the adjustable bolts K'', in combination with the lever L', bar L'', pawl M', ratchet-wheel M'', sprocket-wheel N'', and chain O', whereby the material is automatically fed into the rolls, as set forth.

9. The combination, with the journal-boxes of roll C, of the screw-shafts W W', connected with said boxes, the gear-wheels A' A'' on said screw-shafts, and a connection between the wheels A' A'' and the main shaft, substantially as shown and described.

10. In a machine for rolling iron, having a stationary and movable roll, the combination, with the journal-boxes of the movable roll, of screws connected therewith to move said roll back and forth, and a reversing-gear connected with said screws to turn them in one direction or the other, substantially as shown and described.

11. The combination, with the roll C and its journal-boxes, the screw-shaft W W', connected with said boxes, the gear-wheels A' A'' on said shafts and a friction-wheel on one of the same, of a shaft, C'', carrying a friction-wheel, C', and a pinion, the latter being in gear with both the wheels A' A'', the toggle-levers D, and the friction-wheel B'', mounted thereon, a main driving-shaft and a friction-wheel, B', thereon, and a lever and connections for throwing the friction-wheel B'' into contact with either of the wheels B' or C', substantially as and for the purpose set forth.

12. The combination, with the rolls of a machine for rolling metal, of a work guide and support consisting of a rotating thimble or box mounted in a supporting arm or bracket, and adapted to embrace and hold the article being rolled and to turn therewith, substantially as shown and described.

13. A mechanism for adjusting the article to be rolled to the proper rolling center, consisting of the combination of the bar R'', bolts $b''$, cross-bar C', indicating-plate S', and nuts $c''$, as shown and described.

In testimony whereof we affix our signatures in presence of two witnesses.

THOMAS McBRIDE.
E. FISHER.

Witnesses:
WILLIAM McBRIDE,
GEORGE McBRIDE.